April 5, 1960 F. COETERIER 2,931,982

DEVICE FOR CONVERTING $P_n$- CYCLES PULSE CODE MODULATION INTO PULSE POSITION MODULATION

Filed Oct. 9, 1951

INVENTOR
Frederik Coeterier
By [signature]
Agent 2,931,982

DEVICE FOR CONVERTING $P_n$-CYCLES PULSE CODE MODULATION INTO PULSE POSITION MODULATION

Frederik Coeterier, Eindhoven, Netherlands, assignor, by mesne assignments, to North American Philips Company, Inc., New York, N.Y., a corporation of Delaware Application October 9, 1951, Serial No. 250,489

Claims priority, application Netherlands October 26, 1950

2 Claims. (Cl. 328—109)

The invention relates to a device for use with a particular type of pulse code modulation, to convert this type of pulse code modulation into pulse position modulation as used, for example, in decoding. The invention may, inter alia, be used on the receiver side of a system for the transmission of telegraphy, telephone, facsimile, television signals and the like or, for example, for the transmission of test signals and control signals.

With pulse code modulation, the emitted pulses may be considered to be originated from a series of identical and equidistant pulses, of which particular pulses have been omitted or have inverted polarity in accordance with the signal to be transmitted. With the use of a multi-unit code, for example, a binary 5-unit code, pulse groups are formed of 5-successive pulses, particular pulses of each group being suppressed or having inverse polarity to characterize one of 32 amplitude levels which represent the instantaneous value of the signal.

With this type of pulse code modulation there is a simple relationship between the composition of a code group and an amplitude value represented thereby. Each pulse of a pulse group characterizes by its presence a particular fraction of the maximum instantaneous value to be transmitted, which only varies with the position of the pulse in a pulse group. Decoding is thus rendered possible by very simple means, i.e. an integrating network having a suitable time constant may be used.

However, sometimes such a simple relationship between code and amplitude is not desired, for example, with a view to secrecy; therefore, the use of a $P_n$-cycle code has been suggested. With such a $P_n$-cycle code the basis may be a series of positive and negative pulses (to be designated by code units 1 and 0), wherein each time $n$ successive pulses form all different code groups to characterize at the most $2^n$ different signal values.

For $n=3$ there are two mutually independent code series, i.e., 00010111 and 11101000, with the use of which each time $2^3=8$ different signal values may be reproduced. In the $P_3$ series (to be written in a circle) they are:

000 010 011 110
001 101 111 100

For $n=4$ there are 16 of such code series, with the use of each of which $2^4=16$ signal values may be reproduced. Eight of these $P_4$-code series are:

| | |
|---|---|
| 0000110100101111 | 1111001011010000 |
| 0000100110101111 | 1111011001010010 |
| 0000101100111101 | 1111010011000010 |
| 0000110101111001 | 1111001010000110 |

whereas the other 8 are formed by reading the aforesaid $P_4$-series in the reverse order. For characterizing the $p$th possible level, four successive pulses of the selected series are transmitted, starting from the $p$th pulse.

For $n=5$ there are 2048 $P_5$-code series, with the use of each of which $2^5=32$ possible levels may be characterized.

With the use of a $P_n$-cycle code there is no simple relationship between code and amplitude, as in the aforesaid binary multi-unit code and for decoding the code series the key used must be taken into consideration. Thus, the use of $P_n$-cycle code meets practical difficulties.

The invention has for its object to provide a device for converting pulse code modulation, in accordance with a $P_n$-cycle code into pulse-position modulation for decoding; the latter kind of pulse modulation can be demodulated with the use of comparatively simple known means to regain the signal values transmitted.

According to the invention, with a $P_n$-cycle code having a coding series having positive and negative pulses each time $n$ successive pulses form mutually different code groups to characterize different signal values, the code groups are supplied to a delay line having equidistant tappings, the number and the order of which correspond with the number and the order of succession of the positive and negative pulses of the coding series completed by $(n-1)$ initial pulses, whereas the tappings corresponding to positive pulses on the one hand and the tappings corresponding to negative pulses on the other hand are applied to different output lines, which are connected to the input of a threshold device, the output circuit of which constitutes the output of the converting device, in which the position-modulated pulses are produced. These pulses are then supplied to a demodulator for pulse position modulation.

The threshold voltage of the threshold device is preferably about $(n-1)$ times the voltage produced by a single pulse supplied to the input of the delay line and occurring between the output lines of the delay line.

If the time interval between the incoming code pulses is comparatively great, the delay line to be used in accordance with the invention preferably comprises an electro-mechanical delay element, for example, a rod of ceramic material mainly made of barium titanate and provided with input and output electrodes.

In order that the invention may be more clearly understood and readily carried into effect, it will not be described more fully, with reference to the accompanying drawing, in which.

Figures 1, 2, 3, 4:
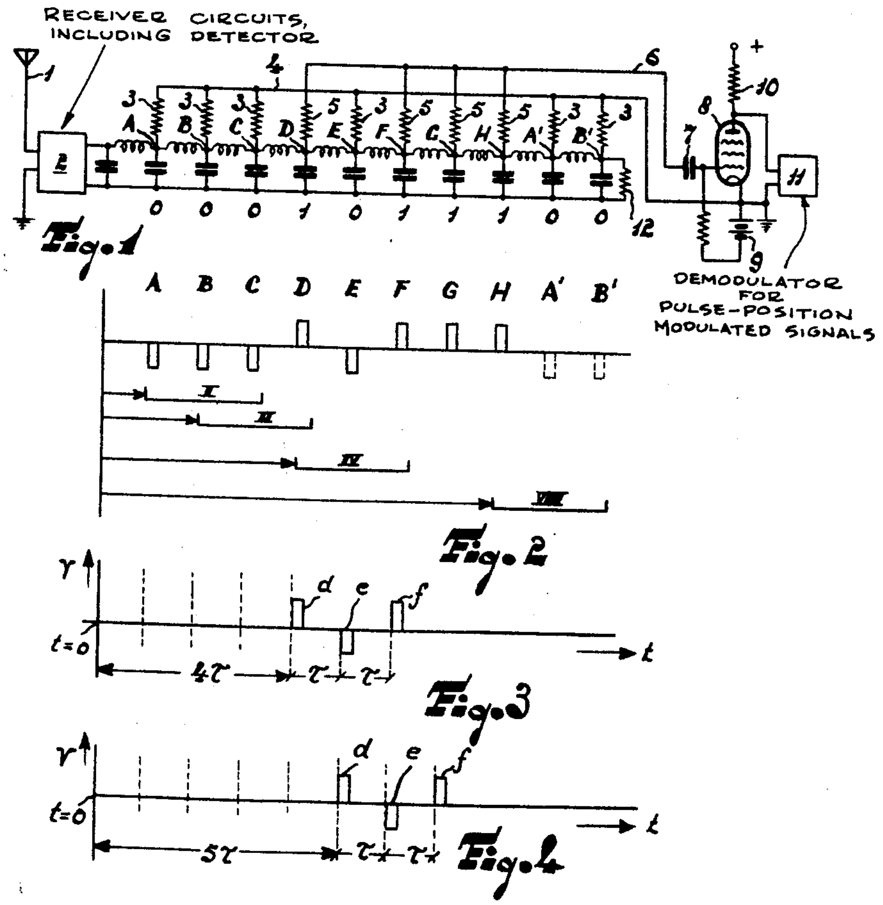
Fig. 1 shows, partly in a diagram, a radio receiver for $P_n$-cycle pulse code modulation, across the output of which is produced position-modulated pulses.
Fig. 2 shows the $P_3$-code series, for which the receiver shown in Fig. 1 is designated.
Figs. 3 and 4 show the same incoming code group at different instants to explain the operation of the receiver shown in Fig. 1.

Fig. 1 shows a radio receiver for pulse code modulation in accordance with a $P_3$-cycle code, comprising an aerial 1 and a high-frequency and detector part 2 (shown in block diagram). Subsequent to detection of the carrier wave the positive and negative pulses of the transmitted code groups are produced across the output circuit of the part 2.

It should be noted here that, with pulse code modulation, it is not necessary to emit positive and negative pulses to obtain the positive and negative pulses aimed at in the receiver, since the negative pulses to be transmitted may be omitted at the transmitter side and may be added at the receiver side, each time an incoming pulse is not produced at an instant when a pulse could occur. Devices designed for this purpose do not form part of the present invention and need not be explained for a good understanding thereof.

The code groups taken from the receiver part 2 are supplied, in order to convert them in accordance with the invention into position modulated-pulses, to an artificial line composed of ten sections, provided with ten tappings A, B, C, D, E, F, G, H, A′, B′. The delay time per section is chosen to be such that it corresponds to the time-interval between the pulses in the incoming code groups.

Fig. 2 shows the $P_3$-code series, which is taken as a basis at the transmitter side. This code series is composed in accordance with the key referred to above 00010111, where the code units 0 designate negative pulses and the code units 1 positive pulses. Accordingly, in Fig. 2, pulses A, B, C, E, A′ and B′ are indicated with negative polarity and pulses D, F, G and H with positive polarity.

With the use of the key indicated in Fig. 2 eight different amplitude levels may be characterized. The amplitude value I is characterized by the first three pulses A, B and C of the series, indicated at I and having all negative polarity. The amplitude value II is characterized by the pulses B, C and D of which the first and the second have negative polarity and the third has positive polarity. In a similar manner the other amplitude values may be characterized by a code group, the basis being each time formed by a particular pulse of the code key, to which the two immediately successive pulses are added to form a code group. Thus, the pulses D, E and F form a code group characteristic of the amplitude value IV and the pulses H, A′ and B′ a code group characteristic of the amplitude value VIII.

When emitting the code groups at the transmitter side, it should be noted that if the code group A, B, C is to be transmitted, the pulses must be emitted in the succession C, B, A.

In the receiver the incoming code groups are supplied to the delay line, which is composed of ten sections and which is provided with ten tappings, of which the order of succession corresponds with the order of succession of the positive and negative pulses occurring in the $P_3$-code series shown in Fig. 2. The tappings A, B, C, E, A′ and B′ corresponding to negative pulses are connected through decoupling resistors 3 to the common output line 4. Similarly, the tappings corresponding to the positive pulses of the code key are connected through decoupling resistors 5 to a common output line 6. The output lines 4 and 5 of the delay line are connected to the control-grid circuit of a pentode amplifier 8 through a grid capacitor 7. The control-grid of the pentode 8 is at a strong negative bias voltage by means of a grid bias voltage battery 9, so that it is normally cut off. The anode lead of the tube comprises an output resistor 10 and the position-modulated pulses aimed at may be taken therefrom, for example, to be supplied to a demodulator 11 for pulse-position modulation.

The operation of the converting device shown in Fig. 1 is now explained with reference to Figs. 3 and 4.

If a code group 101 characteristic of the amplitude value IV is emitted and received, a positive, a negative and a positive pulse are successively supplied to the artificial cable with time intervals $\tau$. If the delay time of each section of the artificial cable is also $\tau$ the pulses of this code group will have propagated along the cable after a period of $4\tau$ subsequent to the reception of the last pulse of the code group, up to the tappings D, E and F, as indicated in Fig. 3 by the pulses *d*, *e* and *f*. At this instant the pulses are exactly at the tappings corresponding to the pulses D, E, F which characterize the amplitude value IV and a voltage of positive polarity of, for example, +9 v. is produced between the output lines 4 and 6; this voltage is three times the voltage produced by a single positive pulse (+3 v.). At any other instant the output voltage is +3 v. maximum and normally it is lower.

A period of $5\tau$ after the reception of the last code group pulse, the pulses *d*, *e* and *f* are at the tappings E, F and G respectively (cf. Figs. 1 and 2), so that the pulses *e* and *f* counteract one another in the output line 6 and only pulse *d* is effective and produces an output voltage of −3 v.

However, if the code group E, F, G were received, exactly at this instant $5\tau$ an output voltage of +9 v. would occur.

Thus the code groups characterizing amplitude values I, II . . . VIII produce a maximum positive output voltage at an instant $\tau$, $2\tau$ . . . $8\tau$ after the reception of the last pulse of a code group and the pulses of maximum positive voltage thus occurring characterize by their instants of occurrence the transmitted amplitude levels. In order to separate these position-modulated pulses of maximum amplitude from other pulses, the output lines 4 and 6 are connected to the control-grid of the normally blocked pentode 8, of which the control-grid has such a bias voltage that only pulses having an amplitude exceeding, for example, +6 v. will cause anode current to be produced. Then only the desired position-modulated pulses occur across the anode resistor 10.

Figure 5:
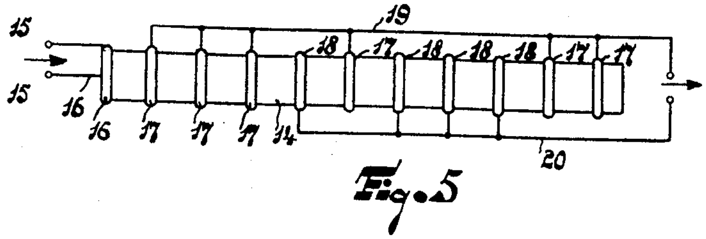
Fig. 5 shows a preferred embodiment of a rod of ceramic material to be used as a delay element.

It is of importance to terminate the artificial cable by its surge impedance, indicated by the resistor 12 shown in Fig. 5, in order to prevent the pulses associated with a given code group from interfering with the correct operation of the device during the reception of the next following code group, because of reflection at the end of the delay line.

Care should furthermore be taken that all pulses of a code group should reach the surge impedance 12 before the next following code group is supplied to the delay line. In time-multiplex systems, in which each channel comprises a separate delay line as shown in Fig. 1, this is in general possible without the need for further means; with the use of the invention for a single transmission channel it may, however, in view of this requirement, be necessary to use a plurality of delay lines in rapid succession and alternately, so that immediately successive code groups are supplied to different delay lines.

As soon as the time interval between successive pulses of a code group is comparatively great, for example in excess of 1 µsec., it may be of advantage to use in the delay line an electromechanical delay element, for example, a rod of ceramic material primarily made of barium-titanate, which is provided with suitable input and output electrodes.

Fig. 5 shows such a rod at 14. The left-hand end of the rod is provided with input electrodes 16 connected to input terminals 15; when a pulse is supplied to the input terminals 15, these electrodes produce a ripple-shaped deformation of the rod surface, which moves slowly towards the other end of the rod, where it is neutralized by a suitable termination of the rod. At equidistant points of the rod embracing output electrodes 17 and 18 are provided and connected to outputs 19 and 20 respectively, similarly to the delay line shown in Fig. 1 and hence in accordance with the $P_3$-series 00010111. The distance between the output electrodes 17 and 18 is chosen to be such, as in the former case, that the ripple-shaped deformation of the rod surface propagates from any output electrodes to the next following within a period corresponding to the time interval between successive pulses of a code group. The position-modulated pulses occurring between the output lines 19 and 20 must be supplied through a threshold device (not shown in Fig. 5) similar to that of Fig. 1 to the user in order to suppress unwanted pulses.

In the foregoing one embodiment of a device according to the invention has been described; this device is arranged to convert a $P_3$-cycle pulse code modulation into pulse-position modulation. It will, however, be evident that the invention may be used in a similar manner for converting $P_4$-cycle code-modulation into pulse-position modulation, in which case, as a matter of course, a delay line must be used with a correspondingly greater number of tappings. With the use of a $P_4$-cycle code use must be made of a delay line having $2^4+(4-1)=19$ tappings, whereas for a $P_5$-cycle code the delay line must have 36 tappings. As a matter of course, it is possible, in the use of, for example, a $P_5$-cycle code, to use not all the 32 possible code groups but only 27 of them. In the latter case a delay line having less than 36 tappings may suffice at the receiver side, i.e., a line having 31 tappings.

What I claim is:

1. A circuit for transforming a $P_n$-cycle coded signal into a pulse-position modulated signal, comprising a source of a $P_n$-cycle coded signal having code groups of successive pulses selected from a cyclically recurring series of equally spaced pulses some of which are of negative polarity and the remainder of which are of positive polarity in a predetermined arrangement, different ones of said code groups representing different values of the signal to be transformed, a delay line having taps thereon at time delay intervals corresponding to the time spacing between the pulses of said series of equally spaced pulses, the number of said taps being equal to the number of pulses in said series plus $(n-1)$ additional pulses, said source being connected to feed said code groups of pulses into said delay line, a first output lead connected to all of said taps at which the time delay corresponds to the respective cyclic time-occurrence of said negative-polarity pulses, a second output lead connected to all of said taps at which the time delay corresponds to the respective cyclic time-occurrences of said positive-polarity pulses, and a threshold device having two input terminals respectively connected to said first and second output leads, said threshold device having a threshold voltage value at which it is responsive to signals received at said input terminals and having a common output circuit for combining the signals received from said first and second output leads which exceed said threshold voltage value.

2. A circuit as claimed in claim 1, in which said threshold voltage value is equal to $(n-1)$ times the voltage produced at said input terminals when a single one of said pulses is fed to said delay line.

References Cited in the file of this patent

UNITED STATES PATENTS

| | | |
|---|---|---|
| 2,227,052 | White | Dec. 31, 1940 |
| 2,266,401 | Reeves | Dec. 16, 1941 |
| 2,401,403 | Bedford | June 4, 1946 |
| 2,406,977 | Wendt | Sept. 3, 1946 |
| 2,414,265 | Lawson | Jan. 14, 1947 |
| 2,415,359 | Loughlin | Feb. 4, 1947 |
| 2,416,863 | Finch et al. | Mar. 4, 1947 |
| 2,449,819 | Purington | Sept. 21, 1948 |
| 2,512,945 | Kallmann | June 27, 1950 |
| 2,522,609 | Gloess | Sept. 19, 1950 |
| 2,530,957 | Gilman | Nov. 21, 1950 |
| 2,543,907 | Gloess et al. | Mar. 6, 1950 |
| 2,562,915 | Hoeppner | Aug. 7, 1951 |
| 2,641,698 | Gloess et al. | June 9, 1953 |

FOREIGN PATENTS

| | | |
|---|---|---|
| 949,805 | France | Mar. 7, 1949 |

UNITED STATES PATENT OFFICE

CERTIFICATE OF CORRECTION

Patent No. 2,931,982 April 5, 1960

Frederik Coeterier

It is hereby certified that error appears in the printed specification of the above numbered patent requiring correction and that the said Letters Patent should read as corrected below.

Column 2, line 20, after "order" insert -- of succession --; line 43, for "not" read -- now --; column 4, line 25, for "Fig. 5" read -- Fig. 1 --.

Signed and sealed this 11th day of April 1961.

(SEAL)
Attest:
ERNEST W. SWIDER

Attesting Officer

ARTHUR W. CROCKER
Acting Commissioner of Patents